United States Patent
Yang et al.

(10) Patent No.: US 11,879,061 B2
(45) Date of Patent: Jan. 23, 2024

(54) HIGH STABILITY POLYMER COMPOSITIONS WITH SILOXANE POLYETHER COMPOUNDS FOR ENHANCED OIL RECOVERY APPLICATIONS

(71) Applicant: Kemira OYJ, Helsinki (FI)

(72) Inventors: Hong Yang, Atlanta, GA (US); Frances Troy, Atlanta, GA (US)

(73) Assignee: KEMIRA OYJ, Helsinki (FI)

( * ) Notice: Subject to any disclaimer, the term of this patent is extended or adjusted under 35 U.S.C. 154(b) by 22 days.

(21) Appl. No.: 16/627,523

(22) PCT Filed: Jun. 29, 2018

(86) PCT No.: PCT/US2018/040300
§ 371 (c)(1),
(2) Date: Dec. 30, 2019

(87) PCT Pub. No.: WO2019/006305
PCT Pub. Date: Jan. 3, 2019

(65) Prior Publication Data
US 2020/0165457 A1     May 28, 2020

Related U.S. Application Data

(60) Provisional application No. 62/527,712, filed on Jun. 30, 2017.

(51) Int. Cl.

| | | |
|---|---|---|
| *C08L 83/12* | (2006.01) | |
| *C08K 5/01* | (2006.01) | |
| *C08K 5/42* | (2006.01) | |
| *C08L 33/26* | (2006.01) | |
| *C08L 71/02* | (2006.01) | |
| *C08L 83/04* | (2006.01) | |
| *C08L 91/00* | (2006.01) | |
| *C09K 8/588* | (2006.01) | |

(52) U.S. Cl.
CPC .............. *C08L 83/12* (2013.01); *C08K 5/01* (2013.01); *C08K 5/42* (2013.01); *C08L 33/26* (2013.01); *C08L 71/02* (2013.01); *C08L 83/04* (2013.01); *C08L 91/00* (2013.01); *C09K 8/588* (2013.01); *C08L 2201/54* (2013.01)

(58) Field of Classification Search
CPC ....... C08L 83/12; C08L 2201/54; C08L 33/26
See application file for complete search history.

(56) References Cited

U.S. PATENT DOCUMENTS

| | | | | |
|---|---|---|---|---|
| 2,753,309 | A * | 7/1956 | Figdor | D21H 21/12 162/190 |
| 3,017,354 | A * | 1/1962 | Riggs, Jr. | C23F 11/10 252/396 |
| 4,042,528 | A * | 8/1977 | Abe | B01D 19/0404 8/581 |
| 4,381,241 | A * | 4/1983 | Romenesko | C09K 8/36 507/926 |
| 4,421,656 | A * | 12/1983 | Donatelli | C08L 83/04 507/127 |
| 4,439,332 | A * | 3/1984 | Frank | C09K 8/58 166/275 |
| 5,124,376 | A * | 6/1992 | Clark, Jr. | C08J 3/03 528/495 |
| 5,216,070 | A * | 6/1993 | Plochocka | C08F 2/32 524/109 |
| 7,803,337 | B1 * | 9/2010 | St. Amant | B01D 53/78 423/220 |
| 9,909,053 | B2 * | 3/2018 | Dwarakanath | C09K 8/68 |
| 10,626,320 | B2 * | 4/2020 | Kim | C09K 8/584 |
| 2010/0062952 | A1 * | 3/2010 | Fenchl | C04B 24/42 507/121 |
| 2013/0197108 | A1 | 8/2013 | Koczo et al. | |
| 2014/0024731 | A1 | 1/2014 | Blanc et al. | |
| 2014/0221549 | A1 | 8/2014 | Webster et al. | |
| 2016/0107103 | A1 * | 4/2016 | Fan | D21H 17/74 516/116 |
| 2016/0122622 | A1 * | 5/2016 | Dwarakanath | C09K 8/588 507/225 |
| 2016/0289526 | A1 * | 10/2016 | Alwattari | C09K 8/52 |
| 2016/0333253 | A1 * | 11/2016 | Logan | B01F 25/314 |
| 2017/0158947 | A1 * | 6/2017 | Kim | E21B 43/20 |
| 2017/0158948 | A1 | 6/2017 | Kim et al. | |
| 2017/0240799 | A1 * | 8/2017 | Wei | C08F 220/56 |

FOREIGN PATENT DOCUMENTS

WO     2014/179127     * 11/2014

OTHER PUBLICATIONS

"Biodiesel Fuel Basics", US Department of Energy, 2022.*
International Search Report for application PCT/US2018/040300, dated Sep. 20, 2018.

* cited by examiner

*Primary Examiner* — Margaret G Moore
(74) *Attorney, Agent, or Firm* — Eversheds Sutherland (US) LLP

(57) ABSTRACT

Liquid polymer and inverse emulsion compositions comprising: one or more hydrophobic liquids having a boiling point at least about 100° C.; one or more acrylamide-(co) polymers; one or more emulsifier surfactants; one or more inverting surfactants; and one or more siloxane polyether compounds. When the composition is inverted in an aqueous solution, it provides an inverted solution having a filter ratio using a 1.2 micron filter (FR1.2) of about 1.5 or less.

13 Claims, No Drawings

HIGH STABILITY POLYMER COMPOSITIONS WITH SILOXANE POLYETHER COMPOUNDS FOR ENHANCED OIL RECOVERY APPLICATIONS

CROSS-REFERENCE TO RELATED APPLICATION

This application is the 35 U.S.C. § 371 national stage application of PCT Application No. PCT/US2018/040300, filed Jun. 29, 2018, which PCT application claims priority to U.S. Provisional Application No. 62/527,712, filed Jun. 30, 2017, the contents of each of which applications are herein incorporated by reference in their entirety.

FIELD OF THE INVENTION

The present disclosure relates to polymer compositions comprising (co)polymers and siloxane polyether compounds, which provide increased stability without detrimentally impacting the filter ratio.

BACKGROUND

Polymer flooding is a technique used in enhanced oil recovery (EOR). It involves injecting an aqueous solution of a water-soluble thickening polymer (e.g., high molecular weight polyacrylamide) into a mineral oil deposit. As a result, it is possible to mobilize additional mineral oil in the formation. Details of polymer flooding and of polymers suitable for this purpose are disclosed, for example, in "Petroleum, Enhanced Oil Recovery," Kirk-Othmer, Encyclopedia of Chemical Technology, online edition, John Wiley and Sons, 2010.

The aqueous polymer solution used in polymer flooding typically has an active polymer concentration of from about 0.05 weight percent to about 0.5 weight percent. Additional components may be added to the aqueous polymer solution, such as surfactants or biocides.

Large volumes of the aqueous polymer solution are necessary for polymer flooding and the process may go on for months or even years. Given the volumes required, conventional polymer flooding involves dissolving the polymer (in the form of a dry powder) on site using fresh water, brine, sea water, production water, and/or formation waste. Unfortunately, the conventional dissolution process is time-consuming and there are few ways to decrease the time without damaging the polymer. The space required for on-site dissolution of dry powder polymers is also significant. While space is normally not a limiting factor in land-based oil production, space is limited in off-shore oil production. Whether land-based or off-shore, the necessary equipment for conventional, dry powder-based on site preparation of polymer flooding solutions is expensive.

Inverse emulsions (water-in-oil) and liquid polymers offer an alternative to on-site dissolution of dry powders, particularly for off-shore oil production. The active polymer concentration in inverse emulsions is typically about 30 weight percent, and is higher in liquid polymer composition. For use, the inverse emulsion or liquid polymer composition is diluted with water to provide the desired final concentration of the polymer.

The description herein of certain advantages and disadvantages of known methods and devices is not intended to limit the scope of the present invention. Indeed, the present embodiments may include some or all of the features described above without suffering from the same disadvantages.

SUMMARY

In view of the foregoing, one or more embodiments include: a liquid polymer or inverse emulsion composition comprising: one or more hydrophobic liquids having a boiling point at least about 100° C.; one or more acrylamide-(co)polymers; one or more emulsifier surfactants; one or more inverting surfactants; and one or more siloxane polyether compounds; wherein, when the composition is inverted in an aqueous solution, it provides an inverted polymer solution having a filter ratio using a 1.2 micron filter (FR1.2) of about 1.5 or less.

Also provided herein are methods for hydrocarbon recovery. The methods for hydrocarbon recovery can comprise providing a subsurface reservoir containing hydrocarbons there within; providing a wellbore in fluid communication with the subsurface reservoir; preparing an inverted polymer solution from the liquid polymer or inverse emulsion compositions described herein; and injecting the inverted polymer solution through the wellbore into the subsurface reservoir.

DETAILED DESCRIPTION

Generally, the various embodiments described herein provide a liquid polymer or inverse emulsion composition with enhanced stability.

It has been observed that inverse emulsion and liquid polymer compositions typically used for EOR applications tend to form gels and experience separation of their oil and water phases over time. In particular, the shelf-life stability of such compositions having high polymer actives may decrease as the solids content is raised. In some instances, such compositions may deteriorate to form an oil film and a hard cake in packaging within the amount of time it takes to manufacture and transport the compositions to the platform (e.g., about 30 days). The hard cake may not be readily redistributed in the composition, which results in lower overall polymer actives in the deteriorated composition. Thickening additives may be used to minimize settling of the inverse emulsion and liquid polymer compositions, however they may have a detrimental effect on the filter ratio of the compositions.

In particular, the compositions according to the embodiments provide increased stability without detrimentally impacting the filter ratio. The compositions comprise one or more stabilizing agents, described herein, which may prevent or minimize sedimentation and/or caking of solids in the liquid polymer or inverse emulsion compositions. In embodiments, the compositions according to the embodiments comprise an acrylamide (co)polymer and one or more stabilizing agents selected from siloxane polyether compounds. In certain embodiments, the compositions are formed by adding one or more siloxane polyether compounds to a liquid polymer or inverse emulsion composition comprising one or more acrylamide-(co)polymers, one or more hydrophobic liquids, one or more emulsifier surfactants, and one or more inverting surfactants. The various embodiments described herein also provide inverted polymer solutions derived from the compositions and methods for preparing the compositions. The liquid polymer and inverse emulsion compositions can be used in EOR applications.

In EOR applications, the inversion of a conventional liquid polymer or inverse emulsion composition is generally difficult. The requirements of the end-users are often very strict: total dissolution in less than 5 minutes, completely and continuously. In certain embodiments, a liquid polymer or inverse emulsion composition dissolves in an aqueous solution to a final concentration of about 50 to about 15,000 ppm, or about 500 to about 5000 ppm in less than about 30 minutes, or less than about 20 minutes, or less than about 10 minutes, or less than about 5 minutes.

An inverted polymer solution prepared from the liquid polymer or inverse emulsion compositions provides excellent performance. An inverted polymer solution according to the embodiments flows through a formation without plugging the pores of the formation. Plugging the formation can slow or inhibit oil production. This is especially concerning where formation permeability is low to start with.

Definitions

As used herein, "enhanced oil recovery" (abbreviated "EOR") refers to various techniques for increasing the amount of crude oil that can be extracted from an oil field that conventional techniques do not recover.

As used herein, "filter ratio" (abbreviated "FR") or "filter quotient" are used interchangeably herein to refer to a test used to determine performance of the liquid polymer composition (or the inverted polymer solution derived therefrom) in conditions of low formation permeability consisting of measuring the time taken by given volumes/concentrations of solution to flow through a filter. The FR generally compares the filterability of the polymer solution for two equivalent consecutive volumes, which indicates the tendency of the solution to plug the filter. Lower FRs indicate better performance.

Two filter ratio test methods are referenced herein. The first method, referred to as "FR5" or "filter ratio using a 5 micron filter," involves passing a 500 mL sample of a polymer solution through a 47 mm diameter polycarbonate filter having 5 micron pores, under 1 bar pressure (+/−10%) of $N_2$ or argon at ambient temperature (e.g., 25° C.). The times required to obtain 100 g, 200 g, 400 g, and 500 g of filtrate are recorded, and the FR5 filter ratio is calculated as $$\frac{\text{time at 500 g} - \text{time at 400 g}}{\text{time at 200 g} - \text{time at 100 g}}.$$

The second method, referred to as "FR1.2" or "filter ratio using a 1.2 micron filter," involves passing a 200 mL sample of a polymer solution through a 47 mm diameter polycarbonate filter having 1.2 micron pores, under 1 bar pressure (+/−10%) of $N_2$ or argon at ambient temperature (e.g., 25° C.). The times required to obtain 60 g, 80 g, 180 g, and 200 g of filtrate are recorded, and the FR1.2 filter ratio is calculated as $$\frac{\text{time at 200 g} - \text{time at 180 g}}{\text{time at 80 g} - \text{time at 60 g}}.$$

Other filter ratio test methods are known and are used in this field. For example, the filter media used may have a different size (e.g., 90 mm), a different pore size, and/or a different substrate (e.g., nitrocellulose), the pressure may be different (e.g., 2 bars), the filtering intervals/amounts may be different, and other changes are envisioned. For example, U.S. Pat. No. 8,383,560 (incorporated herein by reference) describes an FR test method that compares the time taken by given volumes of a solution containing 1000 ppm of active polymer to flow through a 5 micron filter having a diameter of 47 mm at a pressure of 2 bars. In comparison, the methods described herein provide a better screening method for commercial conditions. In particular, the FR1.2 test method described herein, which uses a smaller pore size under lower pressure, provides more predictable results in commercial field testing. Polymers that provide acceptable results in the FR1.2 test method have exhibited easier processing with lower risk of formation damage.

As used herein, "inverted" means that the liquid polymer or inverse emulsion composition is dissolved in an aqueous solution, so that the dispersed polymer phase of the liquid polymer or inverse emulsion composition becomes a substantially continuous phase, and the hydrophobic liquid phase becomes a dispersed, discontinuous phase. The inversion point can be characterized as the point at which the viscosity of the inverted polymer solution has substantially reached its maximum under a given set of conditions. In practice, this may be determined for example by measuring viscosity of the composition periodically over time and when three consecutive measurements are within the standard of error for the measurement, then the solution is considered inverted.

As used herein, the terms "polymer," "polymers," "polymeric," and similar terms are used in their ordinary sense as understood by one skilled in the art, and thus may be used herein to refer to or describe a large molecule (or group of such molecules) that contains recurring units. Polymers may be formed in various ways, including by polymerizing monomers and/or by chemically modifying one or more recurring units of a precursor polymer. A polymer may be a "homopolymer" comprising substantially identical recurring units formed by, e.g., polymerizing a particular monomer. A polymer may also be a "copolymer" comprising two or more different recurring units formed by, e.g., copolymerizing two or more different monomers, and/or by chemically modifying one or more recurring units of a precursor polymer. The term "terpolymer" may be used herein to refer to polymers containing three or more different recurring units. The term "polymer" as used herein is intended to include both the acid form of the polymer as well as its various salts.

As used herein, "polymer flooding" refers to an enhanced oil recovery technique using water viscosified with soluble polymers. Polymer flooding can yield a significant increase in oil recovery compared to conventional water flooding techniques. Viscosity is increased until the mobility of the injectant is less than that of the oil phase in place, so the mobility ratio is less than unity. This condition maximizes oil-recovery sweep efficiency, creating a smooth flood front without viscous fingering. Polymer flooding is also applied to heterogeneous reservoirs; the viscous injectant flows along high-permeability layers, decreasing the flow rates within them and enhancing sweep of zones with lower permeabilities. The two polymers that are used most frequently in polymer flooding are partially hydrolyzed polyacrylamide and xanthan. A typical polymer flood project involves mixing and injecting polymer over an extended period of time until at least about half of the reservoir pore volume has been injected.

Liquid Polymer Compositions

According to the embodiments, the liquid polymer composition comprises one or more polymers dispersed in one or more hydrophobic liquids, and one or more siloxane polyether compounds. In embodiments, the liquid polymer composition further comprises one or more emulsifying surfactants and one or more inverting surfactants. In embodiments, the liquid polymer composition further comprises a small amount of water, for example less than about 12%, about 10%, about 5%, about 3%, about 2.5%, about 2%, or about 1% by weight water, based on the total amount of all components of the liquid polymer composition. In embodiments, the liquid polymer composition can be water-free or at least substantially water-free. The liquid polymer composition may include one or more additional components, which do not substantially diminish the desired performance or activity of the composition. It will be understood by a person having ordinary skill in the art how to appropriately formulate the liquid polymer composition to provide necessary or desired features or properties.

In embodiments, a liquid polymer composition comprises: one or more hydrophobic liquids having a boiling point at least about 100° C.; at least about 39% by weight of one or more acrylamide-(co)polymers; one or more emulsifier surfactants; one or more inverting surfactants; and one or more siloxane polyether compounds; wherein, when the composition is inverted in an aqueous solution, it provides an inverted polymer solution having a filter ratio using a 1.2 micron filter (FR1.2) of about 1.5 or less. In embodiments, the liquid polymer composition may optionally comprise one or more additional stabilizing agents.

In embodiments, when the liquid polymer composition is inverted in an aqueous solution, providing an inverted polymer solution having about 50 to about 15,000 ppm, about 500 to about 5000 ppm, or about 500 to about 3000 ppm, active polymer concentration, the inverted polymer solution has a viscosity of at least about 10 cP, or at least about 20 cP, at about 40° C., and a FR1.2 (1.2 micron filter) of about 1.5 or less.

In embodiments, when the liquid polymer composition is inverted in an aqueous solution, providing an inverted polymer solution having about 50 to about 15,000 ppm, about 500 to about 5000 ppm, or about 500 to about 3000 ppm, active polymer concentration, the inverted polymer solution has a viscosity of at least about 10 cP, or at least about 20 cP, at about 30° C., and a FR1.2 (1.2 micron filter) of about 1.5 or less.

In embodiments, when the liquid polymer composition is inverted in an aqueous solution, providing an inverted polymer solution having about 50 to about 15,000 ppm, about 500 to about 5000 ppm, or about 500 to about 3000 ppm, active polymer concentration, the inverted polymer solution has a viscosity of at least about 10 cP, or at least about 20 cP, at about 25° C., and a FR1.2 (1.2 micron filter) of about 1.5 or less.

In embodiments, when the liquid polymer composition is inverted in an aqueous solution, providing an inverted polymer solution having about 50 to about 15,000 ppm, about 500 to about 5000 ppm, or about 500 to about 3000 ppm, active polymer concentration, the inverted polymer solution has a viscosity of at least about 10 cP, or at least about 20 cP, at about 40° C., and a FR1.2 (1.2 micron filter) of about 1.1 to about 1.3.

In embodiments, when the liquid polymer composition is inverted in an aqueous solution, providing an inverted polymer solution having about 50 to about 15,000 ppm, about 500 to about 5000 ppm, or about 500 to about 3000 ppm, active polymer concentration, the inverted polymer solution has a viscosity of at least about 10 cP, or at least about 20 cP, at about 30° C., and a FR1.2 (1.2 micron filter) of about 1.1 to about 1.3.

In embodiments, when the liquid polymer composition is inverted in an aqueous solution, providing an inverted polymer solution having about 50 to about 15,000 ppm, about 500 to about 5000 ppm, or about 500 to about 3000 ppm, active polymer concentration, the inverted polymer solution has a viscosity of at least about 10 cP, or at least about 20 cP, at about 25° C., and a FR1.2 (1.2 micron filter) of about 1.1 to about 1.3.

In embodiments, when the liquid polymer composition is inverted in an aqueous solution, providing an inverted polymer solution having about 50 to about 15,000 ppm, about 500 to about 5000 ppm, or about 500 to about 3000 ppm, active polymer concentration, the inverted polymer solution has a viscosity of at least about 10 cP, or at least about 20 cP, at about 40° C., and a FR1.2 (1.2 micron filter) of about 1.2 or less.

In embodiments, when the liquid polymer composition is inverted in an aqueous solution, providing an inverted polymer solution having about 50 to about 15,000 ppm, about 500 to about 5000 ppm, or about 500 to about 3000 ppm, active polymer concentration, the inverted polymer solution has a viscosity of at least about 10 cP, or at least about 20 cP, at about 30° C., and a FR1.2 (1.2 micron filter) of about 1.2 or less.

In embodiments, when the liquid polymer composition is inverted in an aqueous solution, providing an inverted polymer solution having about 50 to about 15,000 ppm, about 500 to about 5000 ppm, or about 500 to about 3000 ppm, active polymer concentration, the inverted polymer solution has a viscosity of at least about 10 cP, or at least about 20 cP, at about 25° C., and a FR1.2 (1.2 micron filter) of about 1.2 or less.

In embodiments, the liquid polymer composition, prior to inversion, comprises less than about 12% water by weight, less than about 10% by weight, less than about 7% water by weight, less than about 5% water by weight, or less than about 3% water by weight. In embodiments, the liquid polymer composition, prior to inversion comprises from about 1 to about 12% water by weight, or about 1% to about 5% water by weight based on the total amount of all components of the composition.

In embodiments, the liquid polymer composition, prior to inversion, comprises at least about 39%, about 40%, about 45%, about 50%, about 55%, about 60%, about 65%, about 70%, or about 75% polymer by weight based on the total amount of all components of the composition.

In embodiments, the water in the liquid polymer composition may be freshwater, saltwater, or a combination thereof. Generally, the water used may be from any source, provided that it does not contain an excess of compounds that may adversely affect other components in the composition.

In embodiments, the inverted polymer solution has a viscosity greater than about 10 cP at about 25° C. In embodiments, the inverted polymer solution has a viscosity in the range of about 10 cP to about 35 cP, about 15 to about 30, about 20 to about 35, or about 20 to about 30, at about 25° C. In embodiments, the inverted polymer solution has a viscosity greater than about 10 cP at about 30° C. In embodiments, the inverted polymer solution has a viscosity in the range of about 10 cP to about 30 cP, about 15 cP to about 30 cP, about 15 cP to about 25 cP, about 25 cP to about 30 cP, about 15 cP to about 22 cP, about 20 cP to about 30 cP, at about 30° C. In embodiments, the inverted polymer solution has a viscosity greater than about 10 cP at about 40° C. In embodiments, the inverted polymer solution has a viscosity in the range of about 10 cP to about 35 cP, about 15 cP to about 35 cP, about 15 cP to about 25 cP, about 15 cP to about 22 cP, about 20 cP to about 30 cP, at about 40° C.

In embodiments, the liquid polymer compositions, when inverted in an aqueous solution, provide an inverted polymer solution having a FR1.2 of about 1.5 or less. Put another way, an inverted polymer solution that is derived from the liquid polymer composition disclosed herein provides an FR1.2 of about 1.5 or less. In field testing, the compositions (upon inversion) exhibit improved injectivity over commercially-available polymer compositions, including other polymer compositions having an FR5 (using a 5 micron filter) of about 1.5 or less. In embodiments, the liquid polymer compositions, when inverted in an aqueous solution, provide an inverted polymer solution having a FR1.2 of about 1.1 to about 1.4, about 1.1 to about 1.35, about 1.0 to about 1.3, or about 1.1 to about 1.3.

In embodiments, a liquid polymer composition when inverted has an FR1.2 (1.2 micron filter) of about 1.5 or less, about 1.4 or less, about 1.3 or less, about 1.2 or less, or about 1.1 or less. In embodiments, the liquid polymer composition that is inverted has an FR5 (5 micron filter) of about 1.5 or less, about 1.4 or less, about 1.3 or less, about 1.2 or less, or about 1.1 or less. In embodiments, the liquid polymer composition that is inverted has an FR1.2 of about 1.2 or less and a FR5 of about 1.2 or less.

In embodiments, the inverted polymer solution has a FR1.2 of about 1.5 or less, about 1.4 or less, about 1.3 or less, about 1.2 or less, or about 1.1 or less. In embodiments, the inverted polymer solution has an FR5 of about 1.5 or less, about 1.4 or less, about 1.3 or less, about 1.2 or less, or about 1.1 or less. In other embodiments, the inverted polymer solution has an FR5 of about 1.5 or less, and an FR1.2 of about 1.5 or less.

Inverse Emulsion Compositions

According to the embodiments, an inverse emulsion composition comprises one or more polymers emulsified in one or more hydrophobic liquids, and one or more siloxane polyether compounds. In embodiments, the inverse emulsion composition further comprises one or more emulsifying surfactants and one or more inverting surfactants. The inverse emulsion composition may include one or more additional components, which do not substantially diminish the desired performance or activity of the composition. It will be understood by a person having ordinary skill in the art how to appropriately formulate the inverse emulsion composition to provide necessary or desired features or properties.

In embodiments, the inverse emulsion composition further comprises water. In embodiments, the water is in the emulsified polymer phase. In embodiments, the inverse emulsion comprises greater than about 12% by weight water, based on the total amount of all components of the composition. In embodiments, the water in the inverse emulsion composition may be freshwater, saltwater, or a combination thereof. Generally, the water used may be from any source, provided that it does not contain an excess of compounds that may adversely affect other components in the composition.

In embodiments, the inverse emulsion composition comprises: one or more hydrophobic liquids having a boiling point at least about 100° C.; up to about 35% by weight of one or more acrylamide-(co)polymers; one or more emulsifier surfactants; one or more inverting surfactants; and one or more siloxane polyether compounds, when the composition is inverted in an aqueous solution, it provides an inverted polymer solution having a filter ratio using a 1.2 micron filter (FR1.2) of about 1.5 or less. In embodiments, the inverse emulsion composition may optionally comprise one or more other stabilizing agents.

In embodiments, when the inverse emulsion composition is inverted in an aqueous solution, providing an inverted polymer solution having about 500 to about 5000 ppm, or about 500 to about 3000 ppm, active polymer concentration, the inverted polymer solution has a viscosity of at least 20 cP at 40° C., and a FR1.2 (1.2 micron filter) of about 1.5 or less.

In embodiments, when the inverse emulsion composition is inverted in an aqueous solution, providing an inverted polymer solution having about 500 to about 5000 ppm, or about 500 to about 3000 ppm, active polymer concentration, the inverted polymer solution has a viscosity of at least 20 cP at 30° C., and a FR1.2 (1.2 micron filter) of about 1.5 or less.

In embodiments, the inverse emulsion composition, prior to inversion, comprises up to about 35% polymer by weight, or up to about 30% polymer by weight, based on the total amount of all components of the composition.

In embodiments, the inverted polymer solution has a viscosity in the range of about 25 cP to about 35 cP at about 30° C. In embodiments, the inverted polymer solution has a viscosity greater than about 10 cP at about 40° C. In embodiments, the inverted polymer solution has a viscosity in the range of about 20 cP to about 30 cP at about 40° C.

In embodiments, the inverse emulsion compositions, when inverted in an aqueous solution, provides an inverted polymer solution having a FR1.2 of about 1.5 or less. Put another way, an inverted polymer solution that is derived from the inverse emulsion composition disclosed herein provides an FR1.2 of about 1.5 or less. In field testing, the inverse emulsion compositions, upon inversion, provide improved injectivity over commercially-available polymer compositions, including other polymer compositions having an FR5 (using a 5 micron filter) of about 1.5 or less.

In embodiments, the inverse emulsion composition, when inverted, provides an inverted polymer solution that has an FR1.2 (1.2 micron filter) of about 1.5 or less, about 1.4 or less, about 1.3 or less, about 1.2 or less, or about 1.1 or less. In embodiments, the inverse emulsion composition, when inverted, provides an inverted polymer solution that has an FR5 (5 micron filter) of about 1.5 or less, about 1.4 or less, about 1.3 or less, about 1.2 or less, or about 1.1 or less. In embodiments, an inverse emulsion composition, when inverted, provides an inverted polymer solution that has an FR1.2 of about 1.2 or less and a FR5 of about 1.2 or less.

In embodiments, the inverted polymer solution of the inverse emulsion composition has a FR1.2 of about 1.5 or less, about 1.4 or less, about 1.3 or less, about 1.2 or less, or about 1.1 or less. In embodiments, the inverted polymer solution of the inverse emulsion composition has an FR5 of about 1.5 or less, about 1.4 or less, about 1.3 or less, about 1.2 or less, or about 1.1 or less. In other embodiments, the inverted polymer solution of the inverse emulsion composition has an FR5 of about 1.5 or less, and an FR1.2 of about 1.5 or less.

Below, the components of the liquid polymer and inverse emulsion compositions are discussed in greater detail.

Polymer Component

In embodiments, the liquid polymer or inverse emulsion composition comprises at least one polymer or copolymer. The at least one polymer or copolymer may be any suitable polymer or copolymer, such as a water-soluble thickening polymer or copolymer. Non-limiting examples include high molecular weight polyacrylamide, copolymers of acrylamide and further comonomers, for example vinylsulfonic acid or acrylic acid. Polyacrylamide may be partly hydrolyzed polyacrylamide, in which some of the acrylamide units have been hydrolyzed to acrylic acid. In addition, it is also possible to use naturally occurring polymers, for example xanthan or polyglycosylglucan, as described, for example, by U.S. Pat. No. 6,392,596 B1 or CA 832 277.

In embodiments, the liquid polymer or inverse emulsion composition comprises one or more acrylamide copolymers. In embodiments, the one or more acrylamide (co)polymers is a polymer useful for enhanced oil recovery (EOR) applications. In a particular embodiment, the at least one polymer is a high molecular weight polyacrylamide or partially hydrolyzed products thereof.

In embodiments, the one or more acrylamide (co)polymers are in the form of particles, which are dispersed in the liquid polymer or inverse emulsion composition. In embodiments, the particles of the one or more acrylamide (co) polymers have an average particle size of about 0.4 μm to about 5 μm, or about 0.5 μm to about 4 μm, or about 0.5 μm to about 2 μm. Average particle size refers to the d50 value of the particle size distribution (number average), which can be measured by the skilled artisan using known techniques for determining the particle size distribution.

According to embodiments, the one or more acrylamide (co)polymers are selected from water-soluble acrylamide (co)polymers. In various embodiments, the acrylamide (co) polymers comprise at least 30% by weight, or at least 50% by weight acrylamide units with respect to the total amount of all monomeric units in the (co)polymer.

Optionally, the acrylamide-(co)polymers may comprise besides acrylamide at least one additional co-monomer. In embodiments, the additional comonomer is a water-soluble, ethylenically unsaturated, in particular monoethylenically unsaturated, comonomer. additional water-soluble comonomers should be miscible with water in any ratio, but it is sufficient that the monomers dissolve sufficiently in an aqueous phase to copolymerize with acrylamide. In general, the solubility of such additional monomers in water at room temperature should be at least 50 g/L, preferably at least 150 g/L and more preferably at least 250 g/L.

Other water soluble comonomers comprise one or more hydrophilic groups. The hydrophilic groups are in particular functional groups which comprise atoms selected from the group of O-, N-, S- or P-atoms. Examples of such functional groups comprise carbonyl groups >C=O, ether groups —O—, in particular polyethylene oxide groups —(CH$_2$—CH$_2$—O—)$_n$—, where n is preferably a number from 1 to 200, hydroxy groups —OH, ester groups —C(O)O—, primary, secondary or tertiary amino groups, ammonium groups, amide groups —C(O)—NH— or acid groups such as carboxyl groups —COOH, sulfonic acid groups —SO$_3$H, phosphonic acid groups —PO$_3$H$_2$ or phosphoric acid groups —PO$_4$H$_2$.

Monoethylenically unsaturated comonomers comprising acid groups include monomers comprising —COOH groups, such as acrylic acid or methacrylic acid, crotonic acid, itaconic acid, maleic acid or fumaric acid, monomers comprising sulfonic acid groups, such as vinylsulfonic acid, allylsulfonic acid, 2-acrylamido-2-methylpropanesulfonic acid, 2-methacrylamido-2-methylpropanesulfonic acid, 2-acrylamidobutanesulfonic acid, 3-acrylamido-3-methylbutanesulfonic acid or 2-acrylamido-2,4,4-trimethylpentanesulfonic acid, or monomers comprising phosphonic acid groups, such as vinylphosphonic acid, allylphosphonic acid, N-(meth)acrylamidoalkylphosphonic acids or (meth)acryloyloxyalkylphosphonic acids. Of course the monomers may be used as salts.

The —COOH groups in polyacrylamide-copolymers may not only be obtained by copolymerizing acrylamide and monomers comprising —COOH groups but also by hydrolyzing derivatives of —COOH groups after polymerization. For example, amide groups —CO—NH$_2$ of acrylamide may hydrolyze thus yielding —COOH groups.

Also to be mentioned are derivatives of acrylamide thereof, such as, for example, N-methyl(meth)acrylamide, N,N'-dimethyl(meth)acrylamide, and N-methylolacrylamide, N-vinyl derivatives such as N-vinylformamide, N-vinylacetamide, N-vinylpyrrolidone or N-vinylcaprolactam, and vinyl esters, such as vinyl formate or vinyl acetate. N-vinyl derivatives may be hydrolyzed after polymerization to vinylamine units, vinyl esters to vinyl alcohol units.

Further comonomers include monomers comprising hydroxy and/or ether groups, such as, for example, hydroxyethyl(meth)acrylate, hydroxypropyl(meth)acrylate, allyl alcohol, hydroxyvinyl ethyl ether, hydroxyl vinyl propyl ether, hydroxyvinyl butyl ether or polyethyleneoxide(meth) acrylates.

Other comonomers are monomers having ammonium groups, i.e monomers having cationic groups. Examples comprise salts of 3-trimethylammonium propylacrylamides or 2-trimethylammonium ethyl(meth)acrylates, for example the corresponding chlorides, such as 3-trimethylammonium propylacrylamide chloride (DIMAPAQUAT) and 2-trimethylammonium ethyl methacrylate chloride (MADAMEQUAT).

Yet other comonomers include monomers which may cause hydrophobic association of the (co)polymers. Such monomers comprise besides the ethylenic group and a hydrophilic part also a hydrophobic part. Such monomers are disclosed, for instance, in WO 2012/069477 A1.

In certain embodiments, each of the one or more acrylamide-(co)polymers may optionally comprise crosslinking monomers, i.e. monomers comprising more than one polymerizable group. In certain embodiments, the one or more acrylamide-(co)polymers may optionally comprise crosslinking monomers in an amount of less than about 0.5%, or about 0.1%, by weight, based on the amount of all monomers.

In an embodiment, each of the one or more acrylamide-(co)polymers comprises at least one monoethylenically unsaturated comonomer comprising acid groups, for example monomers which comprise at least one group selected from —COOH, —SO$_3$H—PO$_3$H$_2$, or —PO$_4$H$_2$ Examples of such monomers include but are not limited to acrylic acid, methacrylic acid, vinylsulfonic acid, allylsulfonic acid or 2-acrylamido-2-methylpropanesulfonic acid, particularly preferably acrylic acid and/or 2-acrylamido-2-methylpropanesulfonic acid and most preferred acrylic acid or the salts thereof. The amount of such comonomers comprising acid groups may be from about 0.1% to about 70%, about 1% to about 50%, or about 10% to about 50% by weight based on the amount of all monomers.

In an embodiment, each of the one or more acrylamide-(co)polymers comprise from about 50% to about 90% by weight of acrylamide units and from about 10% to about 50% by weight of acrylic acid units and/or their respective salts. In an embodiment, each of the one or more acrylamide-(co)polymers comprise from about 60% to 80% by weight of acrylamide units and from 20% to 40% by weight of acrylic acid units.

In embodiments, the one or more acrylamide-(co)polymers have a weight average molecular weight ($M_w$) of greater than about 5,000,000 Dalton, or greater than about 10,000,000 Dalton, or greater than about 15,000,000 Dalton, or greater than about 20,000,000 Dalton; or greater than about 25,000,000 Dalton.

In embodiments, the solution viscosity (SV) of a solution of the liquid polymer or inverse emulsion composition having 0.1% active polymer in a 1.0 M NaCl aqueous solution at 25° C., is greater than about 3.0 cP, or greater than about 5 cP, or greater than about 7 cP. The SV of the liquid polymer or inverse emulsion composition may be selected based, at least in part, on the intended actives concentration of the inverted polymer solution, to provide desired performance characteristics in the inverted polymer solution. For example, in embodiments, where the inverted polymer solution is intended to have an actives concentration of about 2000 ppm, it is desirable that the SV of a 0.1% solution of the liquid polymer or inverse emulsion composition is in the range of about 7.0 to about 8.6, because at this level, the inverted polymer solution has desired FR1.2 and viscosity properties. A liquid polymer or inverse emulsion composition with a lower or higher SV range may still provide desirable results, but may require changing the actives concentration of the inverted polymer solution to achieve desired FR1.2 and viscosity properties. For example, if the liquid polymer or inverse emulsion composition has a lower SV range, it would be desirable to increase the actives concentration of the inverted polymer solution.

In embodiments, the amount of the one or more acrylamide-(co)polymers in the liquid polymer composition is at least about 39% by weight based on the total amount of all components of the composition (before dissolution). In embodiments, the amount of the one or more acrylamide-(co)polymers in the liquid polymer composition is from about 39% to about 80%, or about 40% to about 60%, or about 45% to about 55% by weight based on the total amount of all components of the composition (before dissolution). In embodiments, the amount of the one or more acrylamide-(co)polymers in the liquid polymer composition is about 39%, 40%, 41%, 42%, 43%, 44%, 45%, 46%, 47%, 48%, 49%, 50%, 51%, 52%, 53%, 54%, 55%, 56%, 57%, 58%, 59% or about 60% or higher, by weight based on the total amount of all components of the composition (before dilution).

In embodiments, the amount of the one or more acrylamide-(co)polymers in the inverse emulsion composition is less than about 35% or less than about 30% by weight based on the total amount of all components of the composition (before dissolution). In embodiment, the amount of the one or more acrylamide-(co)polymers in the inverse emulsion composition is from about 10% to about 35%, or about 15% to about 30%, or about 20% to about 30% by weight based on the total amount of all components of the composition (before dissolution). In embodiments, the amount of the one or more acrylamide-(co)polymers in the inverse emulsion composition is about 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 13%, 11%, or about 10% or lower, by weight based on the total amount of all components of the composition (before dilution).

Hydrophobic Liquid

In embodiments, the liquid polymer or inverse emulsion composition comprises a hydrophobic liquid component. Any suitable hydrophobic liquid component may be used. The hydrophobic liquid component includes at least one hydrophobic liquid.

In embodiments, the one or more hydrophobic liquids are organic hydrophobic liquids. In embodiments, the one or more hydrophobic liquids each have a boiling point at least about 100° C., about 135° C. or about 180° C. If the organic liquid has a boiling range, the term "boiling point" refers to the lower limit of the boiling range.

In embodiments, the one or more hydrophobic liquids are aliphatic hydrocarbons, aromatic hydrocarbons or mixtures thereof. hydrophobic liquids include but are not limited to: water-immiscible solvents, such as paraffin hydrocarbons, naphthene hydrocarbons, aromatic hydrocarbons, olefins, oils, stabilizing surfactants and mixtures thereof. The paraffin hydrocarbons may be saturated, linear, or branched paraffin hydrocarbons. Aromatic hydrocarbons include, but are not limited to, toluene and xylene. In embodiments, the hydrophobic liquids comprise oils, for example, vegetable oils, such as soybean oil, rapeseed oil and canola oil, and any other oil produced from the seed of any of several varieties of the rape plant.

In embodiments, the amount of the one or more hydrophobic liquids in the liquid polymer or inverse emulsion composition is from about 20% to about 60%, about 25% to about 55%, or about 35% to about 50% by weight based on the total amount of all components of the liquid dispersion polymer composition.

Emulsifying Surfactants

In embodiments, the liquid polymer or inverse emulsion composition optionally comprises one or more emulsifying surfactants.

In embodiments, the one or more emulsifying surfactants are surfactants capable of stabilizing water-in-oil emulsions. Emulsifying surfactants, among other things, lower the interfacial tension between the water and the water-immiscible liquid in the liquid polymer or inverse emulsion composition, so as to facilitate the formation of a water-in-oil polymer emulsion. It is known in the art to describe the capability of surfactants to stabilize water-in-oil-emulsions or oil-in-water emulsions by using the so called "HLB-value" (hydrophilic-lipophilic balance). The HLB-value usually is a number from 0 to 20. In surfactants having a low HLB-value, the lipophilic parts of the molecule predominate and consequently they are usually good water-in-oil emulsifiers. In surfactants having a high HLB-value the hydrophilic parts of the molecule predominate and consequently they are usually good oil-in-water emulsifiers. In embodiments, the one or more emulsifying surfactants are surfactants have an HLB-value of about 2 to about 10, or the mixture of the one or more emulsifying surfactants has an HLB-value of about 2 to about 10.

Emulsifying surfactants include, but are not limited to, sorbitan esters, in particular sorbitan monoesters with C12-C18-groups such as sorbitan monolaurate, sorbitan monopalmitate, sorbitan monostearate, sorbitan monooleate, sorbitan esters with more than one ester group such as sorbitan tristearate, sorbitan trioleate, ethoxylated fatty alcohols with 1 to 4 ethyleneoxy groups, e.g. polyoxyethylene (4) dodecylether ether, polyoxyethylene (2) hexadecyl ether, or polyoxyethylene (2) oleyl ether.

Emulsifying surfactants include, but are not limited to, emulsifiers having HLB values in the range of about 2 to about 10, preferably less than about 7. Suitable such emulsifiers include the sorbitan esters, phthalic esters, fatty acid glycerides, glycerine esters, as well as the ethoxylated versions of the above and any other well-known relatively low HLB emulsifiers. Examples of such compounds include sorbitan monooleate, the reaction product of oleic acid with isopropanolamide, hexadecyl sodium phthalate, decyl sodium phthalate, sorbitan stearate, ricinoleic acid, hydrogenated ricinoleic acid, glyceride monoester of lauric acid, glyceride monoester of stearic acid, glycerol diester of oleic acid, glycerol triester of 12-hydroxystearic acid, glycerol triester of ricinoleic acid, and the ethoxylated versions thereof containing 1 to 10 moles of ethylene oxide per mole of the basic emulsifier. Thus, any emulsifier may be utilized which will permit the formation of the initial emulsion and stabilize the emulsion during the polymerization reaction. Examples of emulsifying surfactants also include modified polyester surfactants, anhydride substituted ethylene copolymers, N,N-dialkanol substituted fatty amides, and tallow amine ethoxylates.

In an embodiment, the liquid polymer or inverse emulsion composition comprises about 0% to about 8%, about 0.05% to about 5%, about 0.1% to about 5%, or about 0.5% to about 3% by weight of the one or more emulsifying surfactants.

These emulsifying surfactants, used alone or in mixtures, are utilized in amounts of greater than about 0.5% or greater than about 1% of the total liquid polymer or inverse emulsion composition.

Inverting Surfactants

In embodiments, the liquid polymer or inverse emulsion composition optionally comprises one or more inverting surfactants. In embodiments, the one or more inverting surfactants are surfactants which may be used to accelerate the formation of an inverted polymer solution (e.g., a (co)polymer solution) after mixing the liquid polymer or inverse emulsion composition with an aqueous solution.

The one or more inverting surfactants are not those which are used as emulsifying surfactants in the embodiments. Inverting surfactants include, but are not limited to, ethoxylated alcohols, alcohol ethoxylates, ethoxylated esters of sorbitan, ethoxylated esters of fatty acids, ethoxylated fatty acid esters, and ethoxylated esters of sorbitol and fatty acids, or any combination of the preceding. Inverting surfactants include nonionic surfactants comprising a hydrocarbon group and a polyalkylenoxy group of sufficient hydrophilic nature. In certain embodiments, nonionic surfactants of the general formula $R^1—O(CH(R^2)—CH_2—O)_nH$ (I) may be used, wherein $R^1$ is a $C_8$-$C_{22}$-hydrocarbon group, preferably an aliphatic $C_{10}$-$C_{18}$-hydrocarbon group, n is a number of preferably and $R^2$ is H, methyl or ethyl with the proviso that at least 50% of the groups $R^2$ are H. Examples of such surfactants include polyethoxylates based on $C_{10}$-$C_{18}$-alcohols such as $C_{12/14}$-, $C_{14/18}$- or $C_{16/18}$-fatty alcohols, $C_{13}$- or $C_{13/15}$-oxoalcohols. The HLB-value may be adjusted by selecting the number of ethoxy groups. Specific examples include tridecylalcohol ethoxylates comprising from 4 to 14 ethylenoxy groups, e.g. tridecylalcohol.8 EO or $C_{12/14}$ fatty alcohol ethoxylates, e.g. $C_{12/14}$. 8 EO. Examples of inverting surfactants also include modified polyester surfactants, anhydride substituted ethylene copolymers, N,N-dialkanol substituted fatty amides, and tallow amine ethoxylates.

Further inverting surfactants comprise anionic surfactants, for example surfactants comprising phosphate or phosphonic acid groups.

In embodiments, the amount of the one or more inverting surfactants in the liquid polymer or inverse emulsion composition is from about 0.5% to about 10%, or from about 1% to about 6% by weight based on the total amount of all components of the liquid polymer or inverse emulsion composition.

In certain embodiments, the one or more inverting surfactants are added to the liquid polymer or inverse emulsion composition directly after preparation of the composition comprising the one or more acrylamide (co)polymers dispersed in one or more hydrophobic liquids, and optionally the one or more emulsifying surfactants (e.g., they may be added after polymerization and/or after dewatering); i.e. the liquid polymer or inverse emulsion composition which is transported from the location of manufacture to the location of use already comprises the one or more inverting surfactants. In another embodiment the one or more inverting surfactants may be added to the liquid polymer or inverse emulsion composition at the location of use, e.g. at an off-shore production site.

Stabilizing Agents

In embodiments, the liquid polymer or inverse emulsion composition comprises one or more stabilizing agents, wherein at least one stabilizing agent is selected from the group consisting of siloxane polyether compounds. The stabilizing agents aim at stabilizing the dispersion of the particles of polyacrylamide-(co)polymers in the organic, hydrophobic phase and optionally also at stabilizing the droplets of the aqueous monomer phase in the organic hydrophobic liquid before and in course of the polymerization. The term "stabilizing" means, as in the usual manner, that the stabilizing agents prevent the dispersion from aggregation and flocculation, or prevent sedimentation and/or caking of the solids or particles in the composition and/or creation of separated oil phase. As used herein, "caking" refers to the formation of lumps or masses from the solids or particles in the composition. Generally, hard caking is characterized by strong, adhesive forces between the particles, and/or the formation of a cake which is difficult to redisperse. Soft caking may be characterized by weak, adhesive forces between the particles, and/or the formation of a cake which is more readily redispersed. Ideally, the solids and particles of the composition remain substantially evenly dispersed in the liquids of the composition. In certain embodiments, the stabilizing agent increases the stability of the liquid polymer or inverse emulsion composition such that the composition shows no caking, or only soft caking, after about 20, about 30, about 40, about 50, about 60, about 70, about 80, about 90 or about 100 days at a temperature in the range of about 30 to 50° C. In certain embodiments, compositions which undergo soft caking are re-dispersable with gentle agitation or stirring. In certain embodiments, the compositions show no caking, or only soft caking, after about 20, about 30, about 40, about 50, about 60, about 70, about 80, about 90 or about 100 days at a temperature in the range of about 30 to 50° C. In embodiments, less than about 10%, about 5%, or about 2% of the solids or particles in the composition have settled into a soft cake after about 20, about 30, about 40, about 50, about 60, about 70, about 80, about 90 or about 100 days at a temperature in the range of about 30 to 50° C.

In an embodiment, the liquid polymer or inverse emulsion composition comprises about 0.5% to about 8%, about 1% to about 5%, about 1.5% to about 5%, or about 1.5% to about 3.5% by weight of the one or more stabilizing agents selected from the group consisting of a siloxane polyether compound. The siloxane polyether compounds used alone or in mixtures, are utilized in amounts of greater than about 0.5%, greater than about 1%, or greater than about 2% by weight of the total liquid polymer or inverse emulsion composition.

In embodiments, the composition comprises a siloxane polyether compound with terminal or pendent ethoxylation. In an embodiment, the composition comprises a siloxane polyether compound with terminal ethoxylation. In an embodiment, the composition comprises a siloxane polyether compound of Formula I:

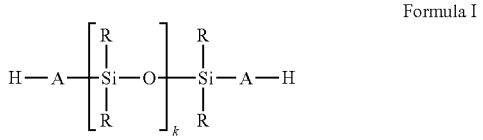

Formula I

Wherein each R is independently selected from methyl, ethyl and propyl; each A independently represents a chain of ethylene oxide (EO) and, optionally, propylene oxide (PO) units, which may be present in block, alternating or random arrangement, wherein the quantity of EO units is in the range of 4 to 30 and the quantity of PO units is in the range of 0 to 30; and k is an integer from 5 to 30.

In embodiments, the A units are the same. In embodiments, the A units are different. In embodiments, the A units comprise only EO units. In embodiments, the A units comprises both EO and PO units, which are present in block arrangement, for example each A group consists of two or more, or three or more, blocks of EO or PO units. In embodiments, the A units comprises both EO and PO units, which are present in random arrangement. In embodiments, the A units comprises both EO and PO units, which are present in an alternating arrangement, e.g. an EO-PO-EO-PO chain.

In embodiments, R is methyl. In embodiments, R is ethyl. In embodiments, R is propyl, for example n-propyl or isopropyl.

In an embodiment, the composition comprises a siloxane polyether compound with pendant ethoxylation. In an embodiment, the composition comprises a siloxane polyether compound of Formula II:

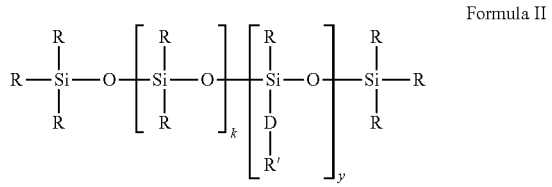

Formula II

Wherein each R is independently selected from methyl, ethyl and propyl;

each D independently represents a chain of ethylene oxide (EO) and, optionally, propylene oxide (PO) units, which may be present in block, alternating or random arrangement, wherein the quantity of EO units is in the range of 3 to 50 and the quantity of PO units is in the range of 0 to 40;

R' is hydroxyl or acetate;

y is an integer from 5 to 30; and k is an integer from 5 to 100.

In certain embodiments, each D independently represents a chain of ethylene oxide (EO) and propylene oxide (PO) units, which may be present in block, alternating or random arrangement, wherein the quantity of EO units is in the range of 3 to 50 and the quantity of PO units is in the range of 3 to 40.

In embodiments, the D units are the same. In embodiments, the D units are different. In embodiments, the D units comprise only EO units. In embodiments, the D units comprises both EO and PO units, which are present in block arrangement, for example each D group consists of two or more, or three or more, blocks of EO or PO units. In embodiments, the D units comprises both EO and PO units, which are present in random arrangement. In embodiments, the D units comprises both EO and PO units, which are present in an alternating arrangement, e.g. an EO-PO-EO-PO chain.

In embodiments, R is methyl. In embodiments, R is ethyl. In embodiments, R is propyl, for example n-propyl or isopropyl.

In embodiments, R' is hydroxyl. In embodiments, R' is acetate.

In an embodiments, the siloxane polyether compound is, for example, a siloxane polyether with pendent ethoxylation and EO/PO ratio in the range of about 15/85 to about 85/15; about 15/85 to about 50/50; or about 25/75 to about 40/60.

In embodiments, the siloxane polyether compound generally includes more EO and/or PO units than siloxane units by weight of the compound. In embodiments, the siloxane polyether compound has pendent ethoxylation and the value of y is greater than the value of k. In embodiments, the siloxane polyether compound has pendent ethoxylation and the k:y ratio is in the range of about 1:3 to about 1:100.

In an embodiments, the siloxane polyether compound is, for example, a siloxane polyether with pendent ethoxylation and an HLB value of about 10 to about 14.

In embodiments, the siloxane polyether compound is selected from the following commercially available products: SG3381 from Wacker, Tegopren 5825 from Evonik, Tegopren 5863 from Evonik, and KF-355A from ShinEtsu.

In embodiments, the compositions may further comprise additional stabilizing agents, for example agents which aim at such stabilization of the dispersion or emulsion, such as oligomeric or polymeric surfactants. Due to the fact that oligomeric and polymeric surfactants have many anchor groups they absorb very strongly on the surface of the particles and furthermore oligomers/polymers are capable of forming a dense steric barrier on the surface of the particles which prevents aggregation. The number average molecular weight Mn of such oligomeric or polymeric surfactants may for example range from 500 to 60,000 Daltons, from 500 to 10,000 Daltons, or from 1,000 to 5,000 Daltons. Oligomeric and/or polymeric surfactants for stabilizing polymer dispersions are known to the skilled artisan. Examples of such stabilizing polymers comprise amphiphilic copolymers, comprising hydrophilic and hydrophobic moiety, amphiphilic copolymers comprising hydrophobic and hydrophilic monomers and amphiphilic comb polymers comprising a hydrophobic main chain and hydrophilic side chains or alternatively a hydrophilic main chain and hydrophobic side chains.

Examples of amphiphilic copolymers comprise copolymers comprising a hydrophobic moiety comprising alkylacrylates having longer alkyl chains, e.g. C6 to C22-alkyl chains, such as for instance hexyl(meth)acrylate, 2-ethylhexyl(meth)acrylate, octyl(meth)acrylate, do-decyl(meth)acrylate, hexadecyl(meth)acrylate or octadecyl(meth)acrylate. The hydrophilic moiety may comprise hydrophilic monomers such as acrylic acid, methacrylic acid or vinyl pyrrolidone.

In an embodiment, the liquid polymer or inverse emulsion composition comprises about 0% to about 8%, about 0.1% to about 5%, or about 1% to about 5% by weight of the one or more additional stabilizing agents described herein.

Other Components

In embodiments, the liquid polymer or inverse emulsion composition may optionally comprise one or more additional components, for example to provide necessary or desirable properties to the composition or to the application. Examples of such components comprise radical scavengers, oxygen scavengers, chelating agents, biocides, stabilizers, or sacrificial agents.

Preparation of Liquid Polymer and Inverse Emulsion Compositions

In embodiments, the liquid polymer or inverse emulsion composition may be synthesized according to the following procedures.

In a first step, an inverse emulsion (water-in-oil emulsion) of acrylamide-(co)polymers is synthesized using procedures known to the skilled artisan. Such inverse emulsions are obtained by polymerizing an aqueous solution of acrylamide and other comonomers, such as water-soluble ethylenically unsaturated comonomers, emulsified in a hydrophobic oil phase. In certain embodiments, in a following step, water within such inverse emulsions is reduced to an amount of less than about 12%, or less than about 10%, or less than about 5%, by weight. Examples of such techniques are described, for instance, in U.S. Pat. Nos. 4,052,353, 4,528, 321, or DE 24 19 764 A1.

For the polymerization, an aqueous monomer solution comprising acrylamide and optionally other comonomers is prepared. Acrylamide is a solid at room temperature and aqueous solutions comprising around 50% by weight of acrylamide are commercially available. If comonomers with acidic groups such as acrylic acid are used the acidic groups may be neutralized by adding aqueous bases such as aqueous sodium hydroxide. The concentration of all monomers together in the aqueous solution should usually be about 10% to about 60% by weight based on the total of all components of the monomer solution, or from about 30% to about 50%, or about 35% to about 45% by weight.

The aqueous solution of acrylamide and comonomers is emulsified in the one or more hydrophobic liquids using one or more emulsifying surfactants. The one or more emulsifying surfactants may be added to the mixture or may be added before to the monomer solution or the hydrophobic liquid. Other surfactants may be used in addition to the one or more emulsifying surfactants, such as a stabilizing surfactant. Emulsifying may be done in the usual manner, e.g. by stirring the mixture.

After an emulsion has been formed polymerization may be initiated by adding an initiator which results in generation of a suitable free radical. Any known free radical initiator may be employed. The initiators may be dissolved in a solvent, including but not limited to water or water miscible organic solvents, such as alcohols, and mixtures thereof. The initiators may also be added in the form of an emulsion. Examples of such initiators include, but are not limited to: azo compounds including 2,2'-azobis(2-amidinopropane) dihydrochloride, 2,2'-azobi [2-(2-imidazolin-2-yl)propane], 2,2'-azobis(isobutyronitrile) (AIBN), 2,2'-azobis(2,4-dimethylvaleronitrile) (AIVN), 2,2'-azobis(2-methylpropionamidine) dihydrochloride, and the like. Other initiators include peroxide initiators, for example benzoyl peroxide, t-butyl peroxide, t-butyl hydroperoxide and t-butyl perbenzoate. Other initiators include, for example, sodium bromate/sulfur dioxide, potassium persulfate/sodium sulfite, and ammonium persulfate/sodium sulfite, as well as initiators disclosed in U.S. Pat. No. 4,473,689.

In certain embodiments, one or more chain transfer agents may be added to the mixture during polymerization. Generally, chain transfer agents have at least one weak chemical bond, which therefore facilitates the chain transfer reaction. Any conventional chain transfer agent may be employed, such as propylene glycol, isopropanol, 2-mercaptoethanol, sodium hypophosphite, dodecyl mercaptan, thioglycolic acid, other thiols and halocarbons, such as carbon tetrachloride. The chain transfer agent is generally present in an amount of about 0.001 percent to about 10 percent by weight of the total emulsion, though more may be used.

The polymerization temperature usually is from about 30° C. to about 100° C., or about 30° C. to about 70° C., or about 35° C. to about 60° C. Heating may be done by external sources of heat and/or heat may be generated by the polymerization reaction itself, in particular when starting polymerization. Polymerization times may be from about 0.5 h to about 10 h.

The polymerization yields an inverse emulsion comprising an aqueous phase of the one or more acrylamide-(co) polymers dissolved or swollen in water wherein the aqueous phase is emulsified in an organic phase comprising the one or more hydrophobic liquids.

In order to convert the inverse emulsion obtained to the liquid polymer compositions, after the polymerization, some or all of the water is distilled off from the emulsion thus yielding particles of the one or more acrylamide-(co)polymers dispersed in the one or more hydrophobic liquids. Liquid polymer compositions having lower water content may provide many of the same advantages as inverse emulsions, but with significantly reduced water content. They may provide a more convenient, economically viable delivery form that offers improved properties to the emulsions or dry polymers. Because of the low/no water content they are substantially a dispersion of the polymer in a hydrophobic oil phase. Some liquid polymers and their manufacture are disclosed, for example, in German Patent Publication No. 2419764 A1, U.S. Pat. Nos. 4,052,353, 4,528,321, 6,365,656 B1, or U.S. Pat. No. 6,833,406 B1 (each of which is incorporated herein by reference in its entirety).

For the liquid polymer compositions, the water is removed to a level of less than about 12%, or less than about 10%, or less than about 7%, or less than about 5%, or less than about 3% by weight. In embodiments, the removal of water is carried out by any suitable means, for example, at reduced pressure, e.g. at a pressure of about 0.00 to about 0.5 bars, or about 0.05 to about 0.25 bars. The temperature for water removal steps may typically be from about 50° C. to about 150° C., although techniques which remove water at higher temperatures may be used. In certain embodiments, one or more of the hydrophobic liquids used in the inverse emulsion may be a low boiling liquid, which can distill off together with the water as a mixture.

Before or after removal of the amount of water desired, the one or more inverting surfactants, and other optional components, may be added.

In embodiments, the one or more siloxane polyether compounds are added to a liquid polymer or an inverse emulsion composition comprising one or more acrylamide-(co)polymers, one or more hydrophobic liquids, one or more emulsifier surfactants, and one or more inverting surfactants. In certain embodiments, the composition is agitated or stirred after the addition of the one or more stabilizing agents as necessary to mix the one or more stabilizing agents into the composition, for example, for a period of at least about 20 minutes.

In embodiments, the one or more stabilizing agents may be added at any point during the preparation of a liquid polymer or inverse emulsion composition as long as it does not adversely impact the formation or resulting properties of the liquid polymer or inverse emulsion composition. In certain embodiments, the one or more stabilizing agents may be added, for example, after dewatering the composition or after the step of removing water from the composition during its preparation. In embodiments, the one or more stabilizing agents may be added alone or with one or more inverting surfactants. When the one or more stabilizing agents are added with the one or more inverting surfactants, they may be added to the composition separately or substantially simultaneously, or mixed to combine and then added to the composition as a blend.

In embodiments, the manufacture of the liquid polymer or inverse emulsion compositions is carried out in chemical production plants.

Aqueous Solutions

In embodiments, the aqueous solution may comprise produced reservoir brine, reservoir brine, sea water, fresh water, produced water, water, saltwater (e.g. water containing one or more salts dissolved therein), brine, synthetic brine, synthetic seawater brine, or any combination thereof.

The term "brine" or "aqueous brine" as used herein refers to sea water; naturally-occurring brine; a chloride-based, bromide-based, formate-based, or acetate-based brine containing monovalent and/or polyvalent cations or combinations thereof. Examples of suitable chloride-based brines include without limitation sodium chloride and calcium chloride. Further without limitation, examples of suitable bromide-based brines include sodium bromide, calcium bromide, and zinc bromide. In addition, examples of formate-based brines include without limitation, sodium formate, potassium formate, and cesium formate.

In certain embodiments, the aqueous solution comprises about 15,000 to about 160,000; about 15,000 to about 100,000; about 15,000 to about 50,000; about 30,000 to about 40,000; about 15,000 to about 16,000 ppm total dissolved solids (tds). In an embodiment, the aqueous solution comprises a brine having about 15,000 ppm tds.

In embodiments, the aqueous solution has a temperature of from about 1° C. to about 120° C., about 4° C. to about 45° C., or about 45° C. to about 95° C.

Generally, the aqueous solution may comprise water from any readily available source, provided that it does not contain an excess of compounds that can adversely affect other components in the inverted polymer solution or render the inverted polymer solution unsuitable for its intended use (e.g., unsuitable for use in an oil and gas operation such as an EOR operation). If desired, the aqueous solution obtained from naturally occurring sources may be treated prior to use. For example, the aqueous solution may be softened (e.g., to reduce the concentration of divalent and trivalent ions in the aqueous fluid) or otherwise treated to adjust their salinity. In certain embodiments, the aqueous solution may comprise soft brine or hard brine. In certain embodiments, the aqueous solution may comprise produced reservoir brine, reservoir brine, sea water, or a combination thereof.

In one embodiment, seawater is used as aqueous solution, since off-shore production facilities tend to have an abundance of seawater available, limited storage space, and transportation costs to and from an off-shore site are typically high. If seawater is used as the aqueous solution, it may be softened prior to the addition of the suspended polymer, thereby removing multivalent ions in the water (e.g., specifically $Mg^{2+}$ and $Ca^{2+}$).

Preparation of Inverted Polymer Solutions

According to various embodiments, a method for preparing an inverted polymer solution may include inverting and diluting a liquid polymer or inverse emulsion composition according to the embodiments described herein in an aqueous solution to provide an inverted polymer solution. In embodiments, the liquid polymer or inverse emulsion composition and an aqueous solution are mixed until the liquid polymer or inverse emulsion composition is inverted in an aqueous solution to provide an inverted polymer solution. Various processes may be employed to prepare the inverted polymer solutions. The inverted polymer solutions are useful, for example, in methods of enhanced oil recovery or in friction reduction applications. In embodiments, an inverted polymer solution comprises a liquid polymer or inverse emulsion composition according to the embodiments and an aqueous solution. In embodiments, an inverted polymer solution comprises a liquid polymer or inverse emulsion composition according to the embodiments, which has been inverted in an aqueous solution.

According to various embodiments, a method for preparing an inverted polymer solution may include inverting and/or diluting a liquid polymer or inverse emulsion composition according to the embodiments described herein in an aqueous solution to provide an inverted polymer solution. In embodiments, the liquid polymer or inverse emulsion composition and an aqueous solution are mixed until the liquid polymer composition is inverted in the aqueous solution to provide an inverted polymer solution.

In embodiments, the liquid polymer or inverse emulsion composition is inverted and diluted in the aqueous solution to provide an inverted polymer solution having an active polymer concentration of acrylamide (co)polymer between about 50 to about 15,000 ppm, or about 500 and about 5000 ppm. In embodiments, the inverted polymer solution has an FR1.2 of about 1.5 or less. In embodiments, the inverted polymer solution has an FR1.2 of about 1.1 to about 1.3. In embodiments, the inverted polymer solution has an FR1.2 of about 1.2 or less.

In some embodiments, the inverted polymer solution can have a concentration of one or more synthetic (co)polymers (e.g., one or more acrylamide (co)polymers) of at least 50 ppm (e.g., at least 100 ppm, at least 250 ppm, at least 500 ppm, at least 750 ppm, at least 1000 ppm, at least 1500 ppm, at least 2000 ppm, at least 2500 ppm, at least 3000 ppm, at least 3500 ppm, at least 4000 ppm, at least 4500 ppm, at least 5000 ppm, at least 5500 ppm, at least 6000 ppm, at least 6500 ppm, at least 7000 ppm, at least 7500 ppm, at least 8000 ppm, at least 8500 ppm, at least 9000 ppm, at least 9500 ppm, at least 10,000 ppm, at least 10,500 ppm, at least 11,000 ppm, at least 11,500 ppm, at least 12,000 ppm, at least 12,500 ppm, at least 13,000 ppm, at least 13,500 ppm, at least 14,000 ppm, or at least 14,500 ppm).

In some embodiments, the inverted polymer solution can have a concentration of one or more synthetic (co)polymers (e.g., one or more acrylamide (co)polymers) of 15,000 ppm or less (e.g., 14,500 ppm or less, 14,000 ppm or less, 13,500 ppm or less, 13,000 ppm or less, 12,500 ppm or less, 12,000 ppm or less, 11,500 ppm or less, 11,000 ppm or less, 10,500 ppm or less, 10,000 ppm or less, 9,500 ppm or less, 9,000 ppm or less, 8,500 ppm or less, 8,000 ppm or less, 7,500 ppm or less, 7,000 ppm or less, 6,500 ppm or less, 6,000 ppm or less, 5,500 ppm or less, 5,000 ppm or less, 4500 ppm or less, 4000 ppm or less, 3500 ppm or less, 3000 ppm or less, 2500 ppm or less, 2000 ppm or less, 1500 ppm or less, 1000 ppm or less, 750 ppm or less, 500 ppm or less, 250 ppm or less, or 100 ppm or less).

The inverted polymer solution can have a concentration of one or more synthetic (co)polymers (e.g., one or more acrylamide (co)polymers) ranging from any of the minimum values described above to any of the maximum values described above. For example, in some embodiments, the inverted polymer solution can have a concentration of one or more synthetic (co)polymers (e.g., one or more acrylamide (co)polymers) of from 500 to 5000 ppm (e.g., from 500 to 3000 ppm, or from 500 to 1500 ppm).

In some embodiments, the inverted polymer solution can be an aqueous unstable colloidal suspension. In other embodiments, the inverted polymer solution can be an aqueous stable solution.

In some embodiments, the inverted polymer solution can have a filter ratio of 1.5 or less (e.g., 1.45 or less, 1.4 or less, 1.35 or less, 1.3 or less, 1.25 or less, 1.2 or less, 1.15 or less, 1.1 or less, or less than 1.05) at 15 psi using a 1.2 μm filter. In some embodiments, the inverted polymer solution can have a filter ratio of greater than 1 (e.g., at least 1.05, at least 1.1, at least 1.15, at least 1.2, at least 1.25, at least 1.3, at least 1.35, at least 1.4, or at least 1.45) at 15 psi using a 1.2 μm filter.

The inverted polymer solution can have a filter ratio at 15 psi using a 1.2 μm filter ranging from any of the minimum values described above to any of the maximum values described above. For example, in some embodiments, the inverted polymer solution can have a filter ratio of from 1 to 1.5 (e.g., from 1.1 to 1.4, or from 1.1 to 1.3) at 15 psi using a 1.2 μm filter.

In certain embodiments, the inverted polymer solution can have a viscosity based on shear rate, temperature, salinity, polymer concentration, and polymer molecular weight. In some embodiments, the inverted polymer solution can have a viscosity of from 2 cP to 100 cP, where the 2 cP to 100 cP is an output using the ranges in the following table:

| Polymer viscosity (cP) | 2~100 |
| Shear rate (1/sec) | 0.1~1000 |
| Temperature (° C.) | 1~120 |
| Salinity (ppm) | 0~250,000 |
| Polymer concentration (ppm) | 50~15,000 |
| Polymer molecular weight (Dalton) | 2M~26M |

In embodiments, the time required for the liquid polymer or inverse emulsion composition to invert in the aqueous solution once the dissolution begins is less than 30 minutes.

Methods of Use

The inverted polymer solutions described herein can be used in a variety of oil and gas operations, including an EOR operation, an improved oil recovery (IOR) operation, a polymer flooding operation, an AP flooding operation, a SP flooding operation, an ASP flooding operation, a conformance control operation, a hydraulic fracturing operation, a friction reduction operation, or any combination thereof. The inverted polymer solutions can even be used in water treatment operations associated with oil and gas operations. In one embodiment, the inverted polymer solution can be used as an injection fluid. In another embodiment, the inverted polymer solution can be included in an injection fluid. In another embodiment, the inverted polymer solution can be used as a hydraulic fracturing fluid. In another embodiment, the inverted polymer solution can be included in a hydraulic fracturing fluid. In another embodiment, the inverted polymer solution can be used as a drag reducer that reduces friction during transportation of a fluid in a pipeline. In another embodiment, the inverted polymer solution can be included in a drag reducer that reduces friction during transportation of a fluid in a pipeline. In short, in certain embodiments, the inverted polymer solutions described herein can be used in hydrocarbon recovery.

Methods of hydrocarbon recovery can comprise providing a subsurface reservoir containing hydrocarbons therewithin; providing a wellbore in fluid communication with the subsurface reservoir; preparing an inverted polymer solution using the methods described above; and injecting the inverted polymer solution through the wellbore into the subsurface reservoir. For example, the subsurface reservoir can be a subsea reservoir and/or the subsurface reservoir can have a permeability of from 10 millidarcy to 40,000 millidarcy.

The wellbore in the second step can be an injection wellbore associated with an injection well, and the method can further comprise providing a production well spaced-apart from the injection well a predetermined distance and having a production wellbore in fluid communication with the subsurface reservoir. In these embodiments, injection of the inverted polymer solution can increase the flow of hydrocarbons to the production wellbore.

In some embodiments, methods of hydrocarbon recovery can further include a recycling step. For example, in some embodiments, methods of hydrocarbon recovery can further comprise producing production fluid from the production well, the production fluid including at least a portion of the injected inverted polymer solution; and using the production fluid to invert an additional liquid polymer or inverse emulsion composition, for example, to form a second inverted polymer solution. The second inverted polymer solution can be injected into at least one wellbore (e.g., an injection well, the same wellbore discussed in the second step or a different wellbore, etc.). Thus, in some embodiments, the inverted polymer solution is included in an injection fluid.

The wellbore in the second step can be a wellbore for hydraulic fracturing that is in fluid communication with the subsurface reservoir. Thus, in one embodiment, the inverted polymer solution injected in the fourth step functions as a drag reducer that reduces friction during injection in the fourth step. By doing so, the inverted polymer solution is used as a drag reducer that reduces friction during transportation of a fluid (e.g., the hydraulic fracturing fluid) in a pipeline (e.g., the wellbore or components thereof). In another embodiment, the inverted polymer solution is included in a hydraulic fracturing fluid.

The liquid polymer or inverse emulsion composition and the inverted polymer solutions according to the embodiments may be used in a subterranean treatment. Such subterranean treatments include, but are not limited to, drilling operations, stimulation treatments, production and completion operations. Those of ordinary skill in the art, with the benefit of this disclosure, will be able to recognize a suitable subterranean treatment.

The liquid polymer or inverse emulsion composition or an inverted polymer solution of the present embodiments may have various uses, for example in crude oil development and production from oil bearing formations that can include primary, secondary or enhanced recovery. Chemical techniques, including for example injecting surfactants (surfactant flooding) to reduce interfacial tension that prevents or inhibits oil droplets from moving through a reservoir or injecting polymers that allow the oil present to more easily mobilize through a formation, can be used before, during or after implementing primary and/or secondary recovery techniques. Such techniques can also be used for enhanced oil recovery, or to complement other enhanced oil recovery techniques.

The liquid polymer or inverse emulsion compositions and inverted polymer solutions can be utilized in such diverse processes as flocculation aids, centrifugation aids, dewatering of mineral slurries, thin lift dewatering, emulsion breaking, sludge dewatering, raw and waste water clarification, drainage and retention aids in the manufacture of pulp and paper, flotation aids in mining processing, color removal, and agricultural applications. Generally, the liquid polymer compositions and inverted polymer solutions described herein can be used as process aids in a variety of solid-liquid separation processes, including but not limited to, flocculation, dewatering, clarification and/or thickening processes or applications. As referred to herein, the term "dewatering" relates to the separation of water from solid material or soil by a solid-liquid separation process, such as by wet classification, centrifugation, filtration or similar processes. In some cases, dewatering processes and apparatus are used to rigidify or improve rigidification of the dispersed particulate materials in the suspension.

The liquid polymer or inverse emulsion compositions and inverted polymer solutions described herein can be used in a variety of dewatering, clarification and/or thickening applications. For example, the liquid polymer or inverse emulsion compositions and inverted polymer solutions can be used in municipal and industrial waste water treatment; clarification and settling of primary and secondary industrial and municipal waste; potable water clarification; in applications in which part or all of the dewatered solids or clarified water is returned to the environment, such as sludge composting, land application of sludge, pelletization for fertilizer application, release or recycling of clarified water, papermaking; food processing applications such as waste dewatering, including waste dewatering of poultry beef, pork and potato, as well as sugar decoloring, sugar processing clarification, and sugar beet clarification; mining and mineral applications, including treatment of various mineral slurries, coal refuse dewatering and thickening, tailings thickening, and Bayer process applications such as red mud settling, red mud washing, Bayer process filtration, hydrate flocculation, and precipitation; biotechnological applications including dewatering and clarification of wastes, such as dewatering and clarification of fermentation broths; and the like.

In embodiments, the liquid polymer or inverse emulsion composition or inverted polymer solution may be used to dewater suspended solids. In embodiments, a method of dewatering a suspension of dispersed solids comprises: (a) intermixing an effective amount of the liquid polymer or inverse emulsion composition or inverted polymer solution, with a suspension of dispersed solids, and (b) dewatering the suspension of dispersed solids.

In embodiments, a method of dewatering an aqueous suspension of dispersed solids comprises: (a) adding an effective amount of a liquid polymer or inverse emulsion composition or inverted polymer solution to the suspension; (b) mixing the liquid polymer or inverse emulsion composition or inverted polymer solution into the suspension to form a treated suspension; and (c) subjecting the treated suspension to dewatering.

The liquid polymer or inverse emulsion compositions or inverted polymer solutions may be employed in the above applications alone, in conjunction with, or serially with, other known treatments.

In embodiments, the liquid polymer or inverse emulsion compositions or inverted polymer solutions may be used in method of deinking of paper mill process water.

In other embodiments, a method of clarifying industrial waste water comprises: adding to the waste water an effective amount of a liquid polymer or inverse emulsion composition; and clarifying the industrial waste water.

In methods the liquid polymer or inverse emulsion compositions or inverted polymer solutions may be used as the sole treatment agent or process aid. In other embodiments, the liquid polymer or inverse emulsion compositions or inverted polymer solutions can be used in combination with other treatment agents and process aids. In embodiments, the method further comprises adding an organic or inorganic coagulant to the waste water.

In embodiments, the liquid polymer or inverse emulsion compositions or inverted polymer solutions may be used in method of sludge dewatering.

In embodiments, the liquid polymer or inverse emulsion compositions or inverted polymer solutions may be used in method of clarification of oily waste water.

The liquid polymer or inverse emulsion compositions or inverted polymer solutions can be used to treat, clarify or demulsify such waste water.

The liquid polymer or inverse emulsion compositions or inverted polymer solutions also may be used in a method of clarifying food processing waste.

In another embodiment, the liquid polymer or inverse emulsion composition or inverted polymer solution may be used in a process for making paper or paperboard from a cellulosic stock.

Other applications which may benefit from the liquid polymer or inverse emulsion compositions or inverted polymer solutions include soil amendment, reforestation, erosion control, seed protection/growth, etc., in which the liquid polymer composition or inverse emulsion or inverted polymer solution is applied to soil.

The following examples are presented for illustrative purposes only, and are not intended to be limiting.

Example 1. Preparation of an Inverse Emulsion Composition

To a 1000 mL beaker (containing a magnetic stir bar), acrylamide (as a 53 wt % solution in water, 276.89 g of solution) was added. The solution was stirred and to this was added glacial acrylic acid (63.76 g), Diethylenetriaminepentaacetic acid (Versenex 80, 40%, 0.53 g) and water (183.31 g). Sodium hydroxide (50 wt %, 70.79 g) was added slowly maintaining the solution temperature below 30° C. until a pH of 6.0-6.5 was achieved. The pH was rechecked and adjusted to 6.0-6.5, if required.

To a 1000 mL beaker (containing a magnetic stir bar) a high boiling paraffin solvent package (211.1 g) was added. The emulsifying surfactant (12.18 g) was added and the mixture was allowed to stir until the surfactants were dissolved. The monomer solution was added to the oil phase (over a period of 30 seconds) with vigorous mixing to form the crude monomer emulsion. Once added, the mixture was allowed to stir for 20 minutes.

The crude monomer emulsion was then homogenized for 20 seconds (using a Ross ME100L homogenizer operating at 4500 rpm). The homogenized emulsion was then transferred to a 1000 mL jacketed reactor equipped with an overhead stirrer, nitrogen and sulfur dioxide gas inlets, thermocouple, vent, and controlled temperature recirculating bath. The reactor contents were then sparged 1.0 hour.

The polymerization reaction was initiated, and the reaction temperature was maintained between about 40 and about 45° C. After the exotherm had ceased, the reaction mixture was warmed to 50° C. and held for 1.5 hours. At the end of 1.5 hours, a sodium metabisulfite solution (37.5 wt %, 17.88 g) was added and allowed to mix for 10 minutes.

Example 2. Preparation of a Liquid Polymer Composition

Emulsion Preparation:

To a 1000 mL beaker (containing a magnetic stir bar), acrylamide (as a 53 wt % solution in water, 276.89 g of solution was added. The solution was stirred and to this was added glacial acrylic acid (63.76 g), Diethylenetriaminepentaacetic acid (Versenex 80, 40%, 0.53 g) and water (183.31 g). Sodium hydroxide (50 wt %, 70.79 g) was added slowly maintaining the solution temperature below 30° C. until a pH of 6.0-6.5 was achieved. The pH was rechecked and adjusted to 6.0-6.5, if required.

To a 1000 mL beaker (containing a magnetic stir bar), a high boiling paraffin solvent package (211.1 g) was added. The emulsifying surfactant (12.18 g) was added and the mixture was allowed to stir until the surfactants were dissolved. The monomer solution was added to the oil phase (over a period of 30 seconds) with vigorous mixing to form the crude monomer emulsion. Once added, the mixture was allowed to stir for 20 minutes.

The crude monomer emulsion was then homogenized for 20 seconds (using a Ross ME100L homogenizer operating at 4500 rpm). The homogenized emulsion was then transferred to a 1000 mL jacketed reactor equipped with an overhead stirrer, nitrogen and sulfur dioxide gas inlets, thermocouple, vent and controlled temperature recirculating bath. The reactor contents were then sparged 1.0 hour.

The polymerization reaction was initiated, and the reaction temperature maintained between about 40° C. and about 45° C. After the exotherm had ceased, the reaction mixture was warmed to 50° C. and held for 1.5 hours. At the end of 1.5 hours, a sodium metabisulfite solution (37.5 wt %, 17.88 g) was added and allowed to mix for 10 minutes.

Water Removal:

Starting emulsions were heated under vacuum in a rotary evaporator to 50° C. until no further distillate condensed. Inverting surfactants were stirred into the resulting dewatered emulsions followed by dissolving these into stirred brine solutions.

Example 3. Preparation and Bench Storage Tests of Exemplary Liquid Polymer Compositions Comprising a Siloxane Polyether Compound Stabilizing Agent 1%, 2% or 3% by weight of one of three different siloxane polyether compound stabilizing agents was slowly added to the composition according to Example 2. Stirring was maintained for at least 20 minutes before commencing the bench storage tests.

Bench storage tests were carried out by placing a standard amount (for example, 40-45 g) of the exemplary liquid polymer compositions comprising a siloxane polyether compound stabilizing agent or a control liquid polymer composition in sample vials. The samples were kept at about 35° C. or about 42-49° C. in an oven and checked for surface bleeding and caking. The silicone polyether compounds included in the compositions tested were: a polyalkylene oxide-modified polydimethylsiloxane in the α,ω-position (A); side chain type polyether (EO/PO 25/75) silicone (B); side chain type polyether (EO/PO 40/60) silicone (C); and side chain type polyether (EO/PO 40/60) silicone (D). The weekly results of the bench storage tests for some of these compounds are provided in Table 1 below.

TABLE 1

| Bench Storage Test Results for samples at 42-49° C. | | | | | | | |
|---|---|---|---|---|---|---|---|
| Sample | 1 week | 2 weeks | 3 weeks | 4 weeks | 5 weeks | 6 weeks | 7 weeks |
| Control | 1 mm of partial hard caking | Thin hard caking | Hard caking, full layer | Thick hard caking, full layer | Thick hard caking, full layer | Thick hard caking, almost all sample | Thick hard caking, almost all sample |
| 1% A | No caking | 1 mm of partial hard caking | Hard caking, less than a full layer | Thick hard caking, full layer | Thick hard caking, full layer | Thick hard caking, half of sample | Thick hard caking, almost all sample |
| 2% A | No caking | No caking | Soft caking, thin, medium | Hard caking, full layer | Hard caking, full layer | Hard caking, full layer | Deep hard caking |
| 3% A | No caking | No caking | No caking | No caking | No caking | A little resistance; a partial soft cake; thin | Thin soft caking with partial hard cake |
| 1% B | No caking | No caking | 1 mm partial soft caking | 85% thin layer of hard caking | 90% Hard caking, | Hard caking | Deep hard caking |
| 2% B | No caking | No caking | No caking | No caking | No caking | No caking | No caking |
| 3% B | No caking | No caking | No caking | No caking | No caking | No caking | No caking |
| 1% C | No caking | No caking | 1 mm partial soft caking | Medium soft caking, about 25% | Hard caking | Hard caking | Hard caking |
| 2% C | No caking | No caking | No caking | No caking | No caking | No caking | No caking |
| 3% C | No caking | No caking | No caking | No caking | No caking | No caking | No caking |

Liquid polymer composition samples including 3% B or 3% C were stored at 35° C. and observed. After 100 days, neither sample showed any caking. A liquid polymer composition sample including 3% D was stored at 42-49° C. and observed. After 50 days, the sample had not shown any caking.

Example 4. Preparation of Inverted Polymer Solutions from Exemplary Compositions A synthetic brine was prepared that included the following: $Na^+$, $Ca^{2+}$, $Mg^{2+}$, $Cl^-$, and tds of about 15,000 ppm. The brine formulation was prepared and filtered through 0.45 μm filter before use. Utilizing a 1000 mL beaker, Teflon coated mixing blade and an overhead stirrer, 360 g of brine was added to the beaker. The brine was agitated at 500 rpm and the liquid polymer composition prepared in Example 2 was added to the brine solution through a syringe at a dosage to result in 10,000 ppm, based on active polymer concentration. This was allowed to mix for 2 hours at a constant 500 rpm. This mother solution was diluted to 2,000 ppm utilizing 80 g of the mother solution and 320 g of additional brine. Brine was added to the beaker first which has a mixing blade stirring with an overhead mixer at 500 rpm and the mother solution was added to the shoulder of the vortex in the mixing brine. This was mixed for an additional 2 hours.

Example 5: Testing of Inverted Polymer Solutions from Exemplary Composition for Impact on Filter Ratio Samples of liquid polymer compositions were prepared as described herein. Each liquid polymer composition included a standard inverting surfactant (6% by weight). The stabilizing agents used in these examples are those described in Example 3.

Standard viscosity (SV) was measured by preparing from the liquid polymer composition (or base emulsion) a 0.20 wt % active polymer solution in deionized water. The polymer composition was added to the water while stirring at 500 rpm. Mixing was continued for 45 min. The 0.20 wt % active polymer solution was diluted to a 0.10 wt % active polymer solution with a 11.7 wt % NaCl solution and mixed for 15 min. The pH was adjusted to 8.0-8.5, and then filtered through 200 μm nylon mesh screen. The viscosity was measured at 25° C. on a Brookfield DV-III viscometer.

The liquid polymer compositions were inverted in brine as described in Example 4.

Viscosities of the brine solutions were measured utilizing an Anton Paar MC302 performing a shear rate sweep from 0.1 $sec^{-1}$ to 100 $sec^{-1}$ at a controlled temperature of 40° C. utilizing a concentric circle spindle attachment. Data were recorded at 10 $sec^{-1}$ with a target viscosity of 20 cP+/−1 cP.

Filter Ratio:

Filter ratio was measured two ways. The FR5 (filter ratio using a 5 micron filter) was determined by passing 500 mL samples of inverted polymer solution prepared as described above through 5 μm, 47 mm diameter polycarbonate filter under 1 bar pressure of $N_2$ or argon. The FR5 was calculated as $$\frac{\text{time at 500 g} - \text{time at 400 g}}{\text{time at 200 g} - \text{time at 100 g}}.$$

For this example, a passing result was considered FR5≤1.2. In samples having an FR5≥1.2 the product was considered not passing and further testing was not completed.

The FR1.2 (filter ratio using a 1.2 micron filter) was determined by passing 200 mL samples of inverted polymer solution prepared as described above through 1.2 μm, 47 mm diameter polycarbonate filter under 1 bar pressure of $N_2$ or Argon. The FR1.2 was calculated as $$\frac{\text{time at 200 g} - \text{time at 180 g}}{\text{time at 80 g} - \text{time at 60 g}}$$

and reported. For this example, a passing result was considered FR1.2≤1.5, but the target for the examples was FR1.2≤1.2.

The results of FR1.2 are shown in Table 2.

TABLE 2

| Liquid Polymer sample | Stabilizing Agent | Viscosity at 10 $sec^{-1}$, 40° C. (cP) | Filter Ratio at 1.2 μm | Time at 200 g (min) |
|---|---|---|---|---|
| 1 | none (control) | 16.6 | 1.089 | 10.02 |
| 1 | A (3% by weight) | 19.4 | 1.100 | 11.06 |
| 2 | none (control) | 24.4 | 1.241 | 16.49 |
| 2 | B (3% by weight) | 25.8 | 1.159 | 15.92 |
| 2 | C (3% by weight) | 25.4 | 1.205 | 15.95 |
| 2 | D (3% by weight) | 24.3 | 1.152 | 13.90 |

It was noted that the exemplary stabilizing agents have minimal or substantially no adverse effect on the filter ratio. In particular, compositions which included the exemplary stabilizing agents retained the property of, when the composition is inverted in an aqueous solution, providing an inverted polymer solution having a filter ratio using a 1.2 micron filter (FR1.2) of about 1.3, or about 1.2, or less. The addition of the siloxane polyether stabilizing agents did not create statistical changes in the viscosity and filter ratio properties of the exemplary compositions.

In the preceding specification, various embodiments have been described. It will, however, be evident that various modifications and changes may be made thereto, and additional embodiments may be implemented, without departing from the broader scope of the exemplary embodiments as set forth in the claims that follow. The specification is accordingly to be regarded in an illustrative rather than restrictive sense.

What is claimed is:

1. A liquid polymer composition comprising:
    a. one or more hydrophobic liquids having a boiling point at least about 100° C.;
    b. at least about 39% by weight of one or more acrylamide-(co)polymers, wherein the one or more acrylamide-(co)polymers optionally comprise crosslinking monomers in an amount of less than about 0.5%, by weight, based on the amount of all monomers of the one or more acrylamide-(co)polymers;
    c. one or more emulsifier surfactants;
    d. one or more inverting surfactants, wherein the one or more inverting surfactants are different from the one or more emulsifier surfactants; and
    e. one or more siloxane polyether compounds having the formula:

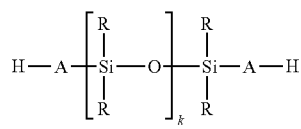

wherein each R is independently selected from methyl, ethyl and propyl; each A independently represents a chain of ethylene oxide (EO) and, optionally, propylene oxide (PO) units, which may be present in block, alternating or random arrangement, wherein the quantity of EO units is in the range of 4 to 30 and the quantity of PO units is in the range of 0 to 30; and k is an integer from 5 to 30, wherein the one or more siloxane polyether compounds are different from the one or more emulsifier surfactants and the one or more inverting surfactants;

wherein, when the composition is inverted in an aqueous solution, it provides an inverted polymer solution having a filter ratio using a 1.2 micron filter (FR1.2) of about 1.5 or less.

2. The composition of claim 1, wherein the siloxane polyether compound has terminal or pendent ethoxylation.

3. The composition of claim 1, wherein the composition comprises about 0.5% to about 8% by weight of the siloxane polyether compound.

4. The composition of claim 1, wherein the aqueous solution comprises produced water, fresh water, salt water, brine, sea water or a combination thereof.

5. The composition of claim 1, wherein the liquid polymer composition further comprises water in an amount of less than about 10%, by weight based on the total amount of all components of the composition.

6. The composition of claim 1, wherein when the composition is inverted in an aqueous solution to provide an inverted polymer solution comprising about 2000 ppm of the one or more acrylamide-(co)polymers, the inverted polymer solution has a viscosity of at least 10 cP at 40° C.

7. The composition of claim 1, wherein when the composition is inverted in an aqueous solution, the inverted polymer solution has a FR1.2 of about 1.1 to about 1.3.

8. The composition of claim 1, wherein when the composition is inverted in an aqueous solution, the inverted polymer solution has a FR1.2 of about 1.2 or less.

9. The composition of claim 1, wherein the one or more hydrophobic liquids having a boiling point at least about 100° C. is selected from the group consisting of paraffin hydrocarbons, naphthene hydrocarbons, aromatic hydrocarbons, olefins, oils, stabilizing surfactants, and mixtures or combinations of the foregoing.

10. The composition of claim 1, wherein each of the one or more acrylamide-(co)polymers comprises at least 30% by weight of acrylamide monomer units with respect to the total amount of all monomeric units in the (co)polymer and that each of the one or more acrylamide-(co)polymers comprises at least one additional ethylenically unsaturated monomer.

11. The composition of claim 1, wherein at least one of the one or more acrylamide-(co) polymers comprises 2-acrylamido-2-methylpropanesulfonic acid or salts thereof.

12. The composition of claim 1, wherein the composition provides the inverted polymer solution in less than 30 minutes.

13. A liquid polymer or inverse emulsion composition comprising:
   a. one or more hydrophobic liquids having a boiling point at least about 100° C.;
   b. one or more acrylamide-(co)polymers, wherein the one or more acrylamide-(co)polymers optionally comprise crosslinking monomers in an amount of less than about 0.5%, by weight, based on the amount of all monomers of the one or more acrylamide-(co)polymers;
   c. one or more emulsifier surfactants having an HLB value of from 2 to 10;
   d. one or more inverting surfactants having an HLB value of from 10 to 20, wherein the one or more inverting surfactants are different from the one or more emulsifier surfactants; and
   e. one or more siloxane polyether compounds having the formula:

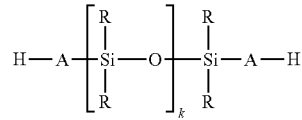

wherein each R is independently selected from methyl, ethyl and propyl; each A independently represents a chain of ethylene oxide (EO) and, optionally, propylene oxide (PO) units, which may be present in block, alternating or random arrangement, wherein the quantity of EO units is in the range of 4 to 30 and the quantity of PO units is in the range of 0 to 30; and k is an integer from 5 to 30, wherein the one or more siloxane polyether compounds are different from the one or more emulsifier surfactants and the one or more inverting surfactants;

wherein, when the composition is inverted in an aqueous solution, it provides an inverted polymer solution having a filter ratio using a 1.2 micron filter (FR1.2) of about 1.5 or less.

* * * * *